(12) United States Patent
Wang

(10) Patent No.: US 12,241,529 B1
(45) Date of Patent: Mar. 4, 2025

(54) EIGHT/SIXTEEN FORWARD GEAR PLANETARY GEAR MECHANISM AUTOMATIC TRANSMISSION SERIES

(71) Applicant: Gang Wang, Beijing (CN)

(72) Inventor: Gang Wang, Beijing (CN)

( * ) Notice: Subject to any disclaimer, the term of this patent is extended or adjusted under 35 U.S.C. 154(b) by 0 days.

(21) Appl. No.: 18/643,196

(22) Filed: Apr. 23, 2024

(51) Int. Cl.
*F16H 3/66* (2006.01)

(52) U.S. Cl.
CPC ......... *F16H 3/66* (2013.01); *F16H 2200/006* (2013.01); *F16H 2200/0078* (2013.01); *F16H 2200/0086* (2013.01); *F16H 2200/0095* (2013.01); *F16H 2200/201* (2013.01); *F16H 2200/2012* (2013.01); *F16H 2200/2043* (2013.01); *F16H 2200/2046* (2013.01); *F16H 2200/2079* (2013.01); *F16H 2200/2094* (2013.01); *F16H 2200/2097* (2013.01)

(58) Field of Classification Search
CPC ............... F16H 3/66; F16H 2200/0078; F16H 2200/0095; F16H 2200/2012; F16H 2200/2046; F16H 2200/2056; F16H 2200/2079; F16H 2200/2094; F16H 2200/2097
USPC ......................................... 475/271–292, 303
See application file for complete search history.

(56) References Cited

U.S. PATENT DOCUMENTS

| | | | |
|---|---|---|---|
| 7,556,582 B2 * | 7/2009 | Gumpoltsberger | F16H 3/66 475/276 |
| 7,824,297 B2 * | 11/2010 | Carey | F16H 3/66 475/275 |
| 2007/0060439 A1 * | 3/2007 | Kamada | F16H 3/66 475/284 |

FOREIGN PATENT DOCUMENTS

| | | | |
|---|---|---|---|
| DE | 102013209675 A1 * | 11/2014 | B60K 6/00 |
| DE | 102013213590 A1 * | 1/2015 | F16H 3/006 |
| KR | 101872795 B1 * | 6/2018 | F16H 3/66 |

* cited by examiner

*Primary Examiner* — Roger L Pang

(57) ABSTRACT

An eight and sixteen forward gear planetary gear mechanism automatic transmission series, where it includes eight forward speeds realized by combining three simple planetary gear sets, five clutches, plus improved and adapted sixteen forward speeds realized by combining four simple planetary gear sets, six clutches. In this solution, a major type of synchronizer clutch being used corresponding to each planetary gear set. The gear train also uses ratchet and pawl pair clutch structure as an alternative option, so that the automatic transmission has a more compact overall structure, the gearshift efficiency is high, the synchronous responsiveness and stability are excellent. The transmission series has wide and uniform transmission gear ratios, making-capacity maximum to achieve 26:1; and the shift unit is simple and reliable, which can significantly enhance the maneuverability of the vehicle driving and reduce fuel consumption and greenhouse gas emissions.

7 Claims, 3 Drawing Sheets

EIGHT/SIXTEEN FORWARD GEAR PLANETARY GEAR MECHANISM AUTOMATIC TRANSMISSION SERIES

TECHNICAL FIELD

The invention relates to the field of vehicle transmission, in particular to an eight-speed transmission with three planetary gear sets and five clutches and another sixteen-speed automatic transmission with four planetary gear sets plus six clutches enhanced on the basis of same structure.

BACKGROUND

AT gearcase includes a combination of epicyclic planetary gear sets and selectively engageable clutches to determine different linkages or constraints of each planetary gear train to form multiple optional gear ratios. The balanced performance in the transmission efficiency and shift smoothness can still be further improved. This is mainly reflected in the fact that the commonly used friction plate clutches and brakes have large rotational drag losses, and quite a part of the mechanical power is converted into heat and wasted by the losses of friction resistance among the friction plates of the clutch in disengaged state. Moreover, the friction plate clutches usually have relatively low torque carrying capacity and low engagement speed, the gearshift logic and actuator driving mechanism are complex, and the gear ratio progression is not uniform. Therefore, to precisely match ICE conditions, there is a particular need for an adaptable enhanced compact multi-gear transmission that directly saves running costs. An effective reduction in these friction losses will provide a highly desired improvement in gearshift efficiency.

In terms of structure type, the transmission with more gear ratios and uniform speed step by innovating the internal structure design and shift elements of the transmission and optimizing the distribution interval of gear ratios. Through the compatibility among gear ratios extension and intermediate connectivity, the power unit can operate under efficient conditions to flexibly meet the driving requirements for torque distribution on wheels, to satisfy the needs of vehicles for traction force under different driving conditions to the maximum extent. This is practical and effective, especially in medium and heavy-duty carrier vehicles. Since the gears can shift automatically, the more gears and uniform gear ratios have a more important selection advantage in dispatch of driving speeds and the decisive optimum in terms of efficiency adaptation.

SUMMARY OF THE INVENTION

The invention provides an eight and sixteen forward gears planetary transmission series. According to the two selectable rotating members' output of each coaxially arranged planetary gear set, the clutches are correspondingly engaged with one or the other synchronously. Through the dual distribution path between the outer-cavity cage and the central main shaft as the power-flow channel, so bypath of power stream from each planetary component to connecting elements linkage through the clutch sleeve getting matched. The overall gear ratio can be changed through the synthesis and decomposition of motion, thus generating eight or sixteen forward gears with uniform distribution and wide range, which not only ensures the power performance, reliability and fuel economy of the vehicle, but also reduces the overall size and weight of the transmission. The invention is realized by the following technical solution.

An eight/sixteen forward gear automatic planetary transmission series, where it includes, in the form of an arrangement and combination of the same basic structures:

Eight forward speeds and two reverse speeds realized by combining three single-piece planetary gear sets with five torque engagement elements;

Sixteen forward speeds and four reverse speeds realized by combining four single-piece planetary gear sets with six torque engagement elements;

In the eight forward gear structure, a first planetary gear set P1, a second planetary gear set P2, and a third planetary gear set P3 are all single pinion type planetary gears composed of a sun gear, a planet carrier supporting the planetary pinions and a ring gear as first, second and third sun gears S1, S2 and S3; first, second and third planet carriers C1, C2 and C3; and first, second and third ring gears R1, R2 and R3. The three planetary gear trains are arranged in the axial direction, where the first planetary gear set P1 and the second planetary gear set P2 both have a fixed mode of the sun gear, the first sun gear S1 is fixedly mounted on the front end cover of the case, and the second sun gear S2 is separately fixed on a positioning bracket of the inner housing of the body.

The third planet carrier C3 and the third ring gear R3 of the third gear set P3 can be fixedly locked respectively or being idled simultaneously. Reverse gears are directly obtained by selectively adjusting the internal variable relationship of the P3 planetary gear assembly, and on the premise that the third sun gear S3 is input, either the third planet carrier C3 or the ring gear R3 may be separately locked by a clutch to undertake output functions of forward or reverse gears. In the forward gear state, the third ring gear R3 is always kept in a locked and fixed state. While a first clutch CL1, a second clutch CL2, a third clutch CL3, a fourth clutch CL4, and a fifth clutch CL5 are sequentially arranged in the input shaft direction. All the clutches are bidirectional, double-side type.

In the sixteen forward gear structure, a first planetary gear set P1, a second planetary gear set P2, a third planetary gear set P3, and a fourth planetary gear set P4 are all single pinion type planetary gears composed of a sun gear, a planet carrier supporting the planetary pinions and a ring gear; the four gear-sets are sequentially arranged in the axial direction, where the first planetary gear set P1 and the second planetary gear set P2 both have a fixed mode of the sun gear, the first sun gear S1 is fixedly mounted on the front end cover of the body case, and the second sun gear S2 is separately fixed on a positioning bracket of the inner housing of the body; the third ring gear R3 of the third planetary gear set P3 is fixedly back-mounted on the positioning bracket of the second sun gear S2.

The fourth planet carrier C4 and the fourth ring gear R4 of the fourth planetary gear set P4 can be selectively fixedly locked respectively or being idled simultaneously. Reverse gears are directly obtained by adjusting the internal variable relationship of the P4 planetary gear assembly, and on the premise that the fourth sun gear S4 is input, either the fourth planet carrier C4 or the ring gear R4 can be separately locked by a clutch to generate forward gears or reverse gears output. In the forward gear state, the fourth ring gear R4 is always kept in a locked and fixed. While a first clutch CL1, a second clutch CL2, a third clutch CL3, a fourth clutch CL4, a fifth clutch CL5, and a sixth clutch CL6 are sequentially arranged in axial direction. All are double-pointed, double-acting type. Planetary gear set P1 and gear set P2 share a first cage (I) for shifting and transmission.

Further, each coaxially arranged single-stage planetary gear train can generate an internal variable (in/out) gear ratio; moreover, the power input end of the planetary gear train can also be directly used as an transmit-receive output end to conduct torque at a 1:1 constant speed, so that each simple planetary gear mechanism has two fixed-value shifting output degrees of freedom; three to four simple planetary gear sets assembling are sequentially gang arranged in the axial direction, with different characteristic parameter values (ring-to-sun ratios), and are selectively engaged and adapted with the clutches, thus generating eight or sixteen gear ratio series conjunctively with overall uniform distribution.

In the eight-speed automatic transmission structure,

The first clutch CL1 is configured to conduct different torques of the first planet carrier C1 and the first ring gear R1 of the first planetary gear set P1 to the first cage (I) by selectively conjugating the outer peripheries locking teeth of their respective members to the CL1 sliding sleeve;

The second clutch CL2 is configured to conduct variable-speed generated by the first planetary gear set P1 via the first cage (I) by selectively conjugating respective members edge-joint of the second ring gear R2 and the second planet carrier C2 of the second planetary gear set P2.

The third clutch CL3 is configured to connect the third sun gear S3 to the third planet carrier C3 as lock-in synchronism when the third planetary gear set P3 is idling, thus the third planetary gear set P3 will rotate rigidly at a constant speed of 1:1.

The fourth clutch CL4 is configured to selectively conjugate, lock and fix the third planet carrier C3 or the third ring gear R3 of the third planetary gear set P3, so that the third planetary gear set P3 has a clear internal variation operating mode for forward and reverse. Or both the third planet carrier C3 and the ring gear R3 are not fixed and cause idling.

The fifth clutch CL5 is configured to finally transmit different torques of the third planetary gear set P3 to the output shaft of the transmission via the second cage (II) by selectively connecting the different output ends of the third ring gear R3 and the third planet carrier C3 of the third planetary gear set P3 through an engagement sleeve.

In the sixteen-speed automatic transmission structure,

The first clutch CL1 is configured to conduct different torques of the first planet carrier C1 and the first ring gear R1 of the first planetary gear set P1 to the first cage (I) by selectively conjugating the outer peripheries locking teeth of their respective members to the CL1 sliding sleeve;

The second clutch CL2 is configured to conduct variable-speed generated by the first planetary gear set P1 via the first cage (I) by selectively conjugate respective members edge-joint of the second ring gear R2 and the second planet carrier C2 of the second planetary gear set P2.

The third clutch CL3 is configured to selectively engage to the C3 reduced speed output of the third planetary gear set P3 or as lock-in synchronism with the central main shaft which transmitted the gearshift torque produced by the second planetary gear set P2 through its second ring gear R2. Then continue synchro-drive the second cage (II) as follow.

The fourth clutch CL4 also linked with the second cage (II), is configured to connect the fourth sun gear S4 to the fourth planet carrier C4 as lock-in synchronism when the fourth planetary gear set P4 is idling, thus the fourth planetary gear set P4 rotates rigidly at a constant speed of 1:1 phase;

The fifth clutch CL5 is configured to selectively conjugate, lock and fix the fourth planet carrier C4 or the ring gear R4 of the fourth planetary gear set P4, so that the planetary gear set P4 has a clear internal variation operating mode for forward and reverse. Or both the fourth planet carrier C4 and the ring gear R4 are not fixed and cause idling.

The sixth clutch CL6 is configured to finally transmit different torques of the fourth planetary gear set P4 to the output shaft of the transmission via the third cage (III) by selectively connecting the different output ends of the fourth ring gear R4 and the planet carrier C4 of the fourth planetary gear set P4 through CL6 engagement sleeve.

In addition, the eight-speed automatic transmission further includes three connecting members, namely a first Cage (I), a central main shaft, and a second Cage (II). The sixteen-speed automatic transmission includes four connecting members, namely a first Cage (I), a central main shaft, a second Cage (II), and a third Cage (III). The connecting members are responsible for the torque conduction through input/output members of each single planetary gear mechanism P1-P4.

Moreover, for synchronizer clutch used in the vehicle transmission, as each gear-set has 2 individual revolution output and release each output through its different collar flange. The double-pointed clutch changes the engagement through the sliding sleeve on the cage simultaneously, the axial translation for the on/off engagement path between different rotating members of each planetary gear set are allowed to be connected and disconnected, thus through the parallel sliding of the clutch sleeve on each cage, generating new torque transmission. The synchronizer clutch can use double cone and triple cone type in order to facilitate the connectivity of the connection-oriented make-break operation. With smooth butt and collar joint getting low energy cost and high load capacity.

For ratchet and pawl coupling, when the clutch disengages from one side gear, the clutch slip-on continually getting engaged in the other side gear during shifting, and there is no power interruption according to synchronous shift. One gearshift course including different clutch actions for both type above can be expected to accomplish consecutively within 100~160 ms.

The invention has the following feature and benefits:

1. In the invention, only three or four simple planetary gear sets PG1, PG2 and PG3 (PG4) plus five or six clutches are used. Depends on each single planetary gear set can generate a determined gear ratio by using the ring-to-sun ratio of the planetary gear set.

Moreover, the power input end member of each planetary gear train may also be directly used as an output end for a constant speed of 1:1, so that each single-row planetary gear mechanism has two optional gear ratios. Furthermore, the gear ratios of three or four simple planetary gear trains are adaptively adjusted to build eight to sixteen reasonably distributed gearshift through an optimized combination with higher efficiency and easier operation. The idling loss is small and the transmission ratio range is wide.

2. In the invention, by adjusting and changing the ring-to-sun ratio of each planetary gear set, the transmission with rich step progression characteristics can be realized at the gear ratio interval. With one, two or three OD overdrive gears or direct constant speed as top gear can be provided.

In addition, the first planetary gear set P1 can also be modified into two subclass gear-set share the sun gear S1. In this structure, the subdivided planet carrier C1' of the first planetary gear mechanism and the subdivided ring gear R2' of the second planetary gear mechanism are integrally forged, with the same internal variable structure and output by the second subcontracted planet carrier C2' at a reduced speed. The simple cascade connection of the first planet carrier C1' to the second ring gear R2' results in a more optimal compound gear ratio for planetary gear set P1, as well as uniform loading on each single-row planetary gear. So does the transmission gear ratio lay-out series.

3. The automatic transmission consists of three or four planetary gear sets independently operate at variable speeds, and each single-stage planetary gear train transmit power at variable speeds in turn during operation. With a simple serial structure of cascade sequence among them, the input always receives the output of the previous mechanism, and the output is directly transmitted to the next-stage element in sequence. The power flow is simple and clear.

Because the internal rotating elements of single-stage planetary gear trains P1, P2, and P3 (P4) (according to ring-to-sun ratio reference) only need to meet the operational structural requirements of the planetary gear sets themselves, and there is no need for additional cross-connecting members with other planetary gear sets. In this way, the inner diameters of rotating members in the single-stage gear sets get significantly reduced, so does the ring gears R1-2-3-4 and the outer diameters of the planetary gears P1-2-3-4 also be reduced, so the overall unit size of the automatic transmission getting reduced and made compact and lightweight.

In other words, the large load capacity for rotating members of the planetary gears can be done without increasing the volume of the planetary gear train, and the transmission has a simple and compact structure, good mechanical form, and few participating actuators, especially without extra cross-binding members of the planetary gear trains causing interference and dragging in shift motions. The gearshift cascade-control has short-cut action approach, low energy consumption, low cost, and stable of actuators during gear shifting, and reliable kinetic performance.

4. The shift clutch according to the invention is compatible with the synchronizer gearshift or dog clutch, engagement sleeve type, and preferred as the major means of shifting. The synchronizer is placed between the two different components of the planetary gear-set. Based on each gear-set can provide 2 gears with their individual part, so one double-side unit synchronizer can be used for to produce two gear ratios, and from both outer-field cage and the main shaft as power-flow conduct way by double-contact clutch sleeve. In terms of the environment layout, it is conducive to simplifying the design and installation of corresponding drive control elements. The synchronizing cone versus the baulk ring both getting radius enlarged and supply torque capacity strong enough as heavy duty purpose in gearshift. The clutch hub which is rabbet joint with the hub sleeve can freely mounted on corresponding planetary gear component circumference conveniently. It eliminates the redundancy loss of friction resistance caused by the idling of the friction plate clutch, and has a clear kinematic structure, efficiency, stability and practicality.

5. The ratchet coupling, the ratchet itself is a clutch in the ratchet and pawl transmission pair. The pawl itself can rotate around the pivot, so that the dynamic contact between the relative positions of the pawl and the ratchet teeth changes accordingly during gear shifting. The annular ratchet grooves on both sides of the inner ring surface and the smooth ring surface in the middle of the inner ring surface. The pawl tip shows an acceleration trend and automatically engages and locks with the grooves on the inner ring surface of the ratchet sleeve through mutual and constant contact, and it engages with the teeth of the ratchet clutch at high speed and has good locking performance, strong torque load force, and complete modular integration. Thus ensuring good mechanical support and smooth transmission effect.

The ratchet keyway and the smooth ring surface have different geometries and are equally spaced on the inner ring surface of the ratchet sleeve; the axial translation of the ratchet ring gear changes the engagement form of the pawls in contact with the inner surface of the ratchet; through the parallel sliding on the cage, the transmission path between the pawls mounted on different rotating members of the planetary gear and the grooves on the inner ring surface of the ratchet are allowed to be connected and disconnected, thus generate new torque gear shifting; in the ratchet and pawl coupling, they are mutually locked in turn and transmit power and torque. So that the clutch may be disengaged from another gear when the clutch is engaged in one gear during gear shifting, and there is no power interruption during synchronous gear shifting.

6. In terms of layout, most clutches located outer-cavity of the gear-set, it is conducive to simplifying the design and installation of corresponding drive control elements. As the outside-in engagement, the radial effective torque radius of the clutch on one side of the periphery of the element zooms, the structural pressure required for transmitting the same torque decreases, which can reduce the overall load density of the clutch, improve the transmission efficiency, reduce the axial length, and enhance the overall weight distribution and load balance of the transmission.

7. In the sixteen-speed transmission series, four single-row planetary gear trains with different ring-to-sun ratios are used to obtain substantially abundant gear ratios, that is, the ratios of overdrive OD gears and downshift gears are flexibly configured until fifteen downshift gears and the direct gear constant speed mode as the highest gear are achieved. In addition, by combining two subdivided single-stage planetary gear sets in series in the first planetary gear assembling, the first gear ratio can reach 12.5-26 depending on configuration. The gear ratios are evenly spaced, and the speed step fluctuation is small. Moreover, the lower gears in the forward direction have large reduction rates, so the low-speed operating condition can be finely adjusted, the start-up of the motor vehicle can be achieved directly by using the shift elements in the transmission, and good mechanical efficiency is maintained in the main driving gears in the middle and high speed phases.

8. In the sixteen forward gearshift according to the invention, four simple planetary gear sets and only six clutches are used to simplify the structure of the automatic transmission, so that the power and torque efficiency range of the engine can precisely match the speed and load required for the vehicle, thus significantly improving the power performance and fuel economy. The first to third forward gears provide larger gear ratios, which is very valuable for improving traction application. Since the transmission has a wide and uniform gear ratio range, the engine can still generate the necessary high driving force in a lower economic speed range to improve fuel efficiency. The clutch shifting is fast and the operation is stable, so it is widely applicable to various types of vehicles.

BRIEF DESCRIPTION OF DRAWERS

Figure 1:
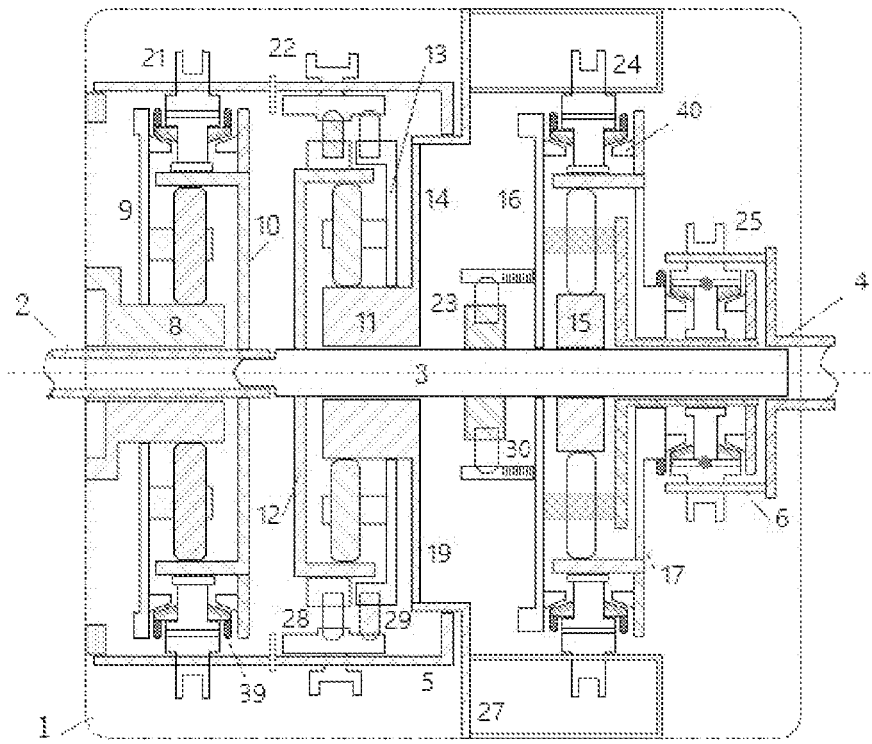
FIG. 1 is a schematic diagram of the first embodiment (three single-stage planetary gear sets) of an eight-speed transmission according to the invention.

In the drawings, 1—transmission body, 2—input shaft, 3—central main shaft, 4—output shaft, 5—first roller cage, 6—second cage, 7—third cage, 8—first sun gear, 9—first planet carrier, 10—first ring gear, 11—second sun gear, 12—second planet carrier, 13—second ring gear, 14—fixing bracket of second sun gear, 15—third sun gear, 16—third planet carrier, 17—third ring, 18—fourth sun gear, 19—fourth planet carrier, 20—fourth ring, 21—first clutch CL1, 22—second clutch CL2, 23—third clutch CL3, 24—fourth clutch CL4, 25—fifth clutch CL5, 26—sixth clutch CL6, 27—stationary cage, 28—pawl A, 29—pawl B, 30—pawl C, 31—planetary pinion, 32—pawl mounting ring seat, 33—ratchet sleeve, 34—ratchet sleeve inside groove, 35—smooth idling end face in the middle of inner ratchet, 36—collar flange and mounting hole of ratchet sleeve, 37—first compound planetary gear train P1, 38—synchro clutch sleeve, 39—synchronizing ring, 40—synchronizing cone; 41—spline hub;

DETAILED DESCRIPTION OF THE PREFERRED EMBODIMENTS

To make the transmission coherent feature and benefit more clear, the technical solutions will be described clearly and completely with reference of the data sheet and schematic drawings in the embodiments of the invention.

(I) An eight forward gear planetary gear train automatic transmission consists of the transmission body 1, three single-stage planetary gear sets, five shift clutches, most are bidirectional double-acting type; three internal connecting members, shift actuator drives, and input shafts 2 plus output shafts 4 at both ends of the transmission body.

| Pgs-1/CL1 | | Pgs-2/CL2 | | Pgs-3/CL3 | Pgs-3/CL4 | | Pgs-3/CL5 | |
|---|---|---|---|---|---|---|---|---|
| Synchronizer | | Pawl A | Pawl B | Pawl C | Synchronizer | | Synchronizer | |
| C1 | R1 | R2 | C2 | C3-S3 | C3 | R3 | R3 | C3 |
| output | output | input | input | lockup | (lock) | (lock) | | |

As shown in Table 1, in the five clutches, CL1, CL4 & CL5 is synchronizer clutch. CL2, CL3 is pawl ratchet coupling type. Pawl A and B are respectively provided on the pawl rings on the outer peripheral surfaces of the ring gear member R2 and planet carrier C2 of the planetary gear P2, and pawl C is provided on the central main shaft between the planetary gear sets P2 and P3, correspond to the carrier C3 of planetary gear set P3. CL4 is locating on the stationary cage exterior of P3, can selectively engage the collar flange teeth of the planet carrier and the ring gear of P3 and it is a brake function.

Each clutch can be selectively operated. The synchronizer type CL1 and ratchet sleeve of the second clutch CL2 are plug-in mounted on the longitudinal beam of the first cage (I), and the four-gear ratio shift action process is completed synchronously by adjusting the clutches CL1 and CL2 to selectively lock and engage with different output/input engagement end faces of the respective rotating members edge joint of the planetary gear sets P1-P2. The pawl C on the central main shaft 3 is then adjusted by using the clutch CL3 to accordingly engage and interlock the P3 planet carrier C3 with sun gear S3, and the on-off mode of the CL4 to change the internal variable relationship of the planetary gear mechanism P3 by individually lock up the ring R3 or carrier C3. Finally, by the fifth clutch CL5 selective engagement to the output shaft to form a full series of shifting course. Thus, eight forward and two reverse gears are achieved by the adaptation between the transmission members and the respective internal variable rotating elements of the planetary gear sets P1-P2-P3.

As shown in FIG. 1, the planetary gear sets P1, P2 and P3 are all single pinion type planetary gears composed of a sun gear, a planet carrier supporting the planetary pinions and a ring gear. The three planetary gear sets are sequentially arranged in the axial direction, and the planetary gear sets P1 and P2 are always a fixed sun gear mode. The sun gear S1 is fixedly mounted on the front end cover of the case body, and the sun gear S2 is separately fixed on a positioning bracket of the inner housing of the case body.

Input shaft rigidly connected to the first ring gear R1, the second ring gear R2 of P2 rigidly connected to the main shaft as the second planetary gear set output end. The planet carrier C3 and the ring gear R3 of the planetary gear set P3 can be selectively fixedly locked respectively or simultaneously idled. In the forward gear state, the ring gear R3 is always kept in a locked and fixed state.

The input shaft (2) passes through the front end cover bearing of the transmission body and the inner hole of the sun gear S1 of the first planetary gear set and is directly fixedly connected to the first ring gear R1 to input the power. The output shaft (4) is connected to the third connecting member (6) to complete the power output. The front input shaft is usually a turbine shaft of the hydraulic torque converter and it transmits the power of the engine to the transmission, and the output shaft subsequently transmits the power to the left and right driving wheels through differentials.

The first connecting member, i.e., the first outer ring Cage (I), is configured as a hollow cylindrical structure with openings on both sides, and the fixed longitudinal beams with open slots at equal spacing are distributed on the surface of the housing. It is provided on the exterior layers of the planetary gear sets P1-P2, and the left and right end faces are supported and installed on the base of positioning steadier on the front end cover of the transmission body and the circular bead, stepped boss circumference of the fixing bracket for the sun gear S2 of the second planetary gear set.

The second connecting member, i. e., the central main shaft (3) of the transmission body, is nested with the inner holes of the sleeve shaft (quill) on the end faces of the input and output shafts as spigot and socket joint supported at the shaft shoulders. With the input shaft, the ring R2 and planet carrier C2, the second sun gear S2 and the fixing bracket, third planet carrier C3, the third sun gear, the second cage (II), and the output shaft in turn in axial direction; and fixedly connected to the second ring gear R2, the third clutch CL3 (pawl C), and the third sun gear S3 to undertake power flow. The pawl seat of the clutch CL3 is connected to the spline keyway of the main shaft and can slide axially to complete the lock-in synchronism on-off adjustment of the planetary gear set P3.

The third connecting member, i.e., the second clutch cage (II), marked as 6; is configured as a hollow shell structure or cylindrical prong structure with one side open and the other closed. It is provided at the end of the transmission body and the fifth clutch CL5 is sleeve plug-in mounted on the longitudinal beam, or the skewer of the cage. The clutch CL5 can also be a dog type from a compact perspective and can move transversely along the cage to alternatively engage with the power output end face R3-C3 of the planetary gear set P3 for transmission, forming forward to reverse gear shift transmission. The output end face of the ring gear R3 is the reverse gear output side.

The synchronizer CL4, the sliding sleeve is connected by through-holes on the rib of the collar flange to the longitudinal beams of an annular stationary cage which is around the planetary gear set P3; it can axially move to selectively engage with the respective outward circular end faces of the front rotating arm of the planet carrier C3 and the third ring gear R3 of the third planetary gear set. The CL4 sliding sleeve moves transversely along the longitudinal beam of the cage to lock and control the different rotating elements, the planet carrier C3 or the ring gear R3 to be stopped respectively. The clutch can be freely switched that allows the forward rotation (forward direction) of P3 and prevents the reverse rotation (backward direction), or prevents the forward rotation and allows the reverse rotation, or to be in neutral state wherever the P3 planetary gear members are simultaneously idling without exact output.

The eight forward gears automatic transmission according to the embodiments are described clearly and completely with reference to the schematic drawings in the invention. As shown in FIG. 1, the first embodiment of the invention provides the 1-OD high gear option. In the embodiment, the first to third planetary gear mechanisms P1-P3 are simple planetary gear sets.

|    | Input           | Output          | Stationary      | Calculation     | Gear Ratio | Ring-to-Sun ratio |
|----|-----------------|-----------------|-----------------|-----------------|------------|-------------------|
| P1 | Ring (R)        | Planet Carrier  | Sun             | (1 + S1/R1)     | 1.56       | 1.7857            |
| P2 | Planet Carrier  | Ring            | Sun             | 1/(1 + S2/R2)   | 0.76923    | 3.333             |
| P3 | Sun             | Planet Carrier  | Ring            | 1 + (R3/S3)     | 3.2258     | 2.2258            |
|    |                 | Ring            | Planet Carrier  | −(R3/S3)        | 2.2258     |                   |

In this example, the configuration of each planetary gear set is shown in Table 2 above. P1 is R1 input source power, and C1 is speed-down output, or direct R1 constant speed output mode; P2 is C2 input, and R2 is speed-up output or R2 input and direct constant speed output; P3 is always S3 input, and the ring gear R3, the planet carrier C3 are alternately blockaded by the CL4 stopper to form C3 speed-down output or R3 output reverse gear. Or C3 and R3 are unlocked simultaneously and C3 interlocked with S3 by the third clutch CL3, then P3 produces overall 1:1 constant speed output.

Specific gearshift ratio-kinematic logic: P1(1.56/1)×P2(0.76923/1)×P3(3.2258/1), in parentheses are the two gear ratios value of each single-stage planetary gear mechanism: internal variable speed gear ratio and constant speed gear ratio. The gear ratio of each gear path is comprehensively determined by the characteristic parameters of individual planetary gear set, i.e., the ratio for the number of teeth of the ring gear to that of the sun gear. In the first embodiment, the fixed gear ratios of gear-set can be obtained when (R1/S1)≈1.7857, (R2/S2)≈3.333, and (R3/S3)≈2.225. The specific gear distribution from lowest to top is as follows: 5.032_3.87_3.2258_2.481_1.56_1.2_1_0.76923. The wide overall gear ratio range for the forward gears is obtained, and (5.032/0.76923) reaches 6.5416.

The following is a description of the power shift by P1-P2-P3 gang control of eight forward and two reverse gears. To realize a specific gear output, it is necessary to adjust the detail engagement and release relative elements of each planetary gear mechanism. The related operation process of gears is as follows:

1st gear D1, simultaneous kinematic equation of gear ratio:

$$P1(1.56) \times P2(1) \times P3(3.2258)$$

The synchro clutch CL1 moves leftward on the first cage, so that the output end of P1-C1 locking teeth engages with CL1 sliding sleeve. The clutch CL2 ratchet moves rightward on the first cage and pawl B at the P2-C2 radical end is contracted and idled by the smooth belt in the middle of the inner ring surface of the ratchet, and pawl A at P2-R2 collar rim engages with the left grooves of the CL2 ratchet inner surface to input torque. The clutch CL3 is in neutral. The synchro clutch CL4 moves rightward on the stationary cage, and the R3 rim cross-linked and engages with sleeve, ring gear R3 is locked and fixed. Clutch CL5 moves rightward on second cage, engages and locks the output end of P3-C3, and realizes integral transmission with the output shaft through longerons of the second cage.

Transmission path: Input shaft→ring gear R1→C1 rim output end→CL1 sleeve→first cage→CL2 ratchet→pawl A at input end of R2→R2 ring gear→main shaft (3)→third sun gear S3→third planet carrier C3→shaft sleeve outward output end face of C3 rear rotating arm→CL5 engagement sleeve→second cage→Output shaft.

2nd gear D2, simultaneous kinematic equation of gear ratio: P1(1.56)×P2(0.76923)×P3(3.2258)

{According to the 1st gear} The second clutch CL2 moves leftward so that pawl A at the input end of P2-R2 is contracted and idled by the smooth inner ring surface of the ratchet, and pawl B at the rim end of the planet carrier C2 is released to engage with and lock the ratchet teeth at the right end of the inner ring of the CL2 ratchet, thus realizing shifting and transmission;

Transmission path: Input shaft→ring gear R1→C1 rim output end→CL1 sleeve→first cage→CL2 ratchet→pawl B at input end of planet carrier C2→R2 ring gear→main shaft (3)→third sun gear S3→third planet carrier C3→shaft sleeve outward output end face of C3 rear rotating arm→CL5 sleeve→second cage→Output shaft 3rd gear D3, simultaneous kinematic equation of gear ratio: P1(1)×P2(1)×P3(3.2258)

{According to the 2nd gear} The clutch CL1 moves rightward so that the output end of P1-R1 is locking to engage with the sleeve. The second clutch CL2 moves rightward so that pawl B at the input end of P2-C2 is contracted and idled, and pawl A at the rim input end of P2-R2 is released to engage with the groove on the inner ring surface at the left end of the ratchet, thus realizing overall transmission.

Transmission path: Input shaft→ring gear R1→R1 rim output end→CL1 sleeve→first cage→CL2 ratchet→pawl A at input end of ring gear R2→R2 ring gear→main shaft (3)→third sun gear S3→third planet carrier C3→shaft sleeve outward output end face of C3 rear rotating arm→CL5 sleeve→second cage→Output shaft 4th gear D4, simultaneous kinematic equation of gear ratio:

$$P1(1) \times P2(0.76923) \times P3(3.2258)$$

{According to the 3rd gear} The clutch CL2 moves leftward so that pawl A at the input end of P2-R2 is contracted and idled by the smooth belt in the middle of the inner ring surface of the ratchet, and pawl B at the input end of P2-C2 is released to engage with and lock the grooves of the inner ring at the right end of the ratchet, thus realizing transmission.

Transmission path: Input shaft→ring gear R1→R1 rim output end→CL1 sleeve→first cage→CL2 ratchet→pawl B at input end of planet carrier C2→R2 ring gear→main shaft (3)→third sun gear S3→third planet carrier C3→shaft sleeve outward output end face of C3 rear rotating arm→CL5 sleeve→second cage→Output shaft 5th gear D5, simultaneous kinematic equation of gear ratio: P1(1.56)×P2(1)×P3(1) {According to the 4th gear} The synchro clutch CL1 moves leftward to engage with the output end of P1-C1. The clutch CL2 moves rightward so that pawl B is contracted and idled, and pawl A at the constant speed input end of P2-R2 is released to engage with the ratchet teeth on the inner ring surface. The synchro clutch CL4 moves leftward to the neutral position along the stationary cage, so that the ring gear R3 is unlocked, the planetary gear set P3 idled and has no fixed output. Meanwhile, the clutch CL3 from a neutral state is moving rightward along the keyway of the central main shaft, so that push pawl C engages with of the ratchet ring gear which is fixed on the sidewall of the front rotating arm of the planet carrier C3. thus C3 and S3 is locked together to form a rigid body rotation of the planetary gear set P3 in constant speed 1:1, thus realizing overall transmission.

Transmission path: Input shaft→ring gear R1→C1 rim output end→CL1 sleeve→first cage→CL2 ratchet→pawl A at input end of R2→R2 ring gear→main shaft (3)→pawl C→clutch CL3 ratchet→front rotating arm of planet carrier C3→shaft sleeve output end face of C3 rear rotating arm→CL5 sliding sleeve→second cage→output shaft 6th gear D6, simultaneous kinematic equation of gear ratio: P1(1.56)×P2(0.76923)×P3(1)

{According to the 5th gear} The second clutch CL2 moves leftward so that pawl A at the input end of P2-R2 is contracted and idled by the smooth inner ring surface of the ratchet, and pawl B at the input end of the planet carrier C2 is released to engage with and lock the groove at the right end of the inner ring of the CL2 ratchet, thus realizing shifting and transmission;

Transmission path: Input shaft→ring gear R1→C1 rim output end→CL1 sleeve→first cage→CL2 ratchet→pawl B at input end of C2→R2 ring gear→main shaft (3)→pawl C→clutch CL3 ratchet→front rotating arm of planet carrier C3→shaft sleeve output end face of C3 rear rotating arm→CL5 engagement sleeve→second cage→Output shaft 7th gear D7, simultaneous kinematic equation of gear ratio: P1(1)×P2(1)×P3(1)

{According to the 6th gear} The clutch CL1 moves rightward so that the output end of P1-R1 is locking to engage with the sleeve. The second clutch CL2 moves rightward so that pawl B at the input end of P2-C2 is contracted and idled, and pawl A at the input end of P2-R2 is released to engage with the groove on the inner ring surface at the left side of the ratchet, the gear is the 1:1 direct gear mode. Thus realizing overall transmission.

Transmission path: Input shaft→ring gear R1→R1 rim output end→CL1 sleeve→first cage→CL2 ratchet→pawl A at input end of R2→R2 ring gear→main shaft (3)→pawl C→clutch CL3 ratchet→front rotating arm of planet carrier C3→shaft sleeve output end face of C3 rear rotating arm→CL5 engagement sleeve→second cage→Output shaft 8th gear D8, simultaneous kinematic equation of gear ratio: P1(1)×P2(0.76923)×P3(1)

{According to the 7th gear} The clutch CL2 moves leftward on the first cage so that pawl A on the end face of the ring gear R2 is contracted, unlocked and idled, and pawl B at the input end of P2-C2 is released to tilt to engage with the grooves on the inner ring surface at the right side of the ratchet, thus realizing overdrive transmission. The gear is the highest gear of total gear train.

Transmission path: Input shaft→ring gear R1→R1 rim output end→CL1 sleeve→first cage→CL2 ratchet→pawl B at input end of C2→R2 ring gear→main shaft (3)→pawl C→clutch CL3 ratchet→front rotating arm of planet carrier C3→shaft sleeve output end face of C3 rear rotating arm→CL5 engagement sleeve→second cage→Output shaft Reverse gear R1, simultaneous kinematic equation of gear ratio: -P1(1.56)×P2(1)×P3(2.2258)

The synchro clutch CL1 sliding sleeve moves leftward to engage with the output edge of C1. The clutch CL2 moves rightward so that pawl B is idled, and pawl A engages with the CL2 ratchet for input from R2. Clutch CL3 is idled. The synchro type CL4 moves leftward on the fixed cage, so the carrier C3 circumferential edge fixed and blockage with the CL4 sleeve, ring gear R3 released and rotating reversely.

The clutch CL5 moves leftward on the second cage to engage with the reverse output end of P3-R3, thus realizing reverse transmission to output shaft through the second cage.

Transmission path: Input shaft→ring gear R1→output end of C1→CL1 sleeve→first cage→CL2 ratchet→pawl A at input end of R2→R2 ring gear→main shaft (3)→third sun gear S3→third ring gear R3→R3 output end→CL5 engagement sleeve→second cage→Output shaft.

Reverse gear R2, simultaneous kinematic equation of gear ratio: −P1(1.56)×P2(0.76923)×P3(2.2258)

{According to the reverse 1st gear} The clutch CL2 moves leftward so that pawl A on P2-R2 rim is contracted and idled, and pawl B at the rim input end of P2-C2 released outward to engage with the groove on the right inner ring surface of CL2. The clutches CL1, CL3, CL4 and CL5 remain in the original engaged state, thus realizing overall transmission.

Transmission path: Input shaft→ring gear R1→output end of C1→CL1 sleeve→first cage→CL2 ratchet→pawl B at input end of C2→R2 ring gear→main shaft (3)→third sun gear S3→third ring gear R3→R3 output end→CL5 engagement sleeve→second cage→Output shaft.

TABLE 3

Sequential Logic Diagram of 1-OD Overdrive Shift Control Keys according to the First Embodiment of the invention:

| | P1-CL1 synchronizer | | P2-CL2 | | CL3 | P3-CL4 synchronizer | | P3-CL5 synchronizer | |
|---|---|---|---|---|---|---|---|---|---|
| | | | pawl A | pawl B | pawl C | C3 | R3 | | |
| Gears | C1 | R1 | R2 | C2 | C3-S3 | (Lock) | (Lock) | R3 | C3 |
| $1^{st}$ | ⊗ | | ⊗ | | | | ⊗ | ⊗ | ⊗ |
| $2^{nd}$ | ⊗ | | | ⊗ | | | ⊗ | ⊗ | ⊗ |
| $3^{rd}$ | | ⊗ | ⊗ | | | | ⊗ | ⊗ | ⊗ |
| $4^{th}$ | | ⊗ | | ⊗ | | | ⊗ | ⊗ | ⊗ |
| $5^{th}$ | ⊗ | | ⊗ | | ⊗ | | | ⊗ | ⊗ |
| $6^{th}$ | ⊗ | | | ⊗ | ⊗ | | | ⊗ | ⊗ |
| $7^{th}$ | | ⊗ | ⊗ | | ⊗ | | | ⊗ | ⊗ |
| $8^{th}$ | | ⊗ | | ⊗ | ⊗ | | | ⊗ | ⊗ |
| Reverse 1 | ⊗ | | ⊗ | | | ⊗ | | ⊗ | |
| Reverse 2 | ⊗ | | | ⊗ | | ⊗ | | ⊗ | |

In the table, ⊗ indicates that the clutch is engaging with the planetary element. Others without marks in empty, indicate that the released idling state or is not engaged as a freewheel.

Figure 2:
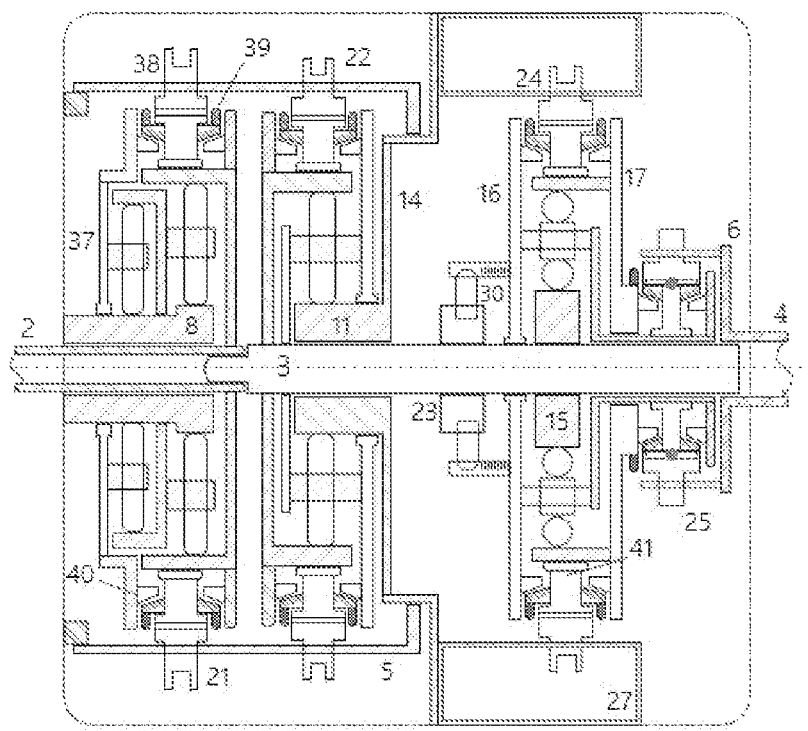
FIG. 2 is a schematic diagram of the first and third embodiment which has a series connection of compound planetary gear train in the P1 gear set according to the invention.

As shown in FIG. 2, for the 1-OD overdrive gear series, the first planetary gear set uses two sub single planetary gear set to get a refurbished compound gear ratio list of, i. e., P1$a$ (1.333)×P1$b$(1.25)=1.666, so the gear ratio calculation logic of powertrain is P1(1.666/1)×P2(0.76923/1)×P3(3.2258/1). The shift logic is the same as in the table 3 above. Gear distribution:
5.376_4.135_3.2258_2.481_1.666_1.282_1_0.76923. The gear ratios can also be expressed as (out/in) version: 0.186_0.2418_0.31_0.403_0.6_0.78 1_1.3. The total gear ratio ranges of forward gears (5.376/0.76923) reach 6.988.

TABLE 4

Logic Diagram for Engagement Sequence of Eighth Forward Gears (2-OD).

| | | | | | | CL4 | | | |
|---|---|---|---|---|---|---|---|---|---|
| | CL1 | | CL2 | | CL3 | | | CL5 | |
| Gears | C1 | R1 | R2 | C2 | C3-S3 | (Lock) | (Lock) | R3 | C3 |
| $1^{st}$ | ⊗ | | ⊗ | | | | ⊗ | ⊗ | ⊗ |
| $2^{nd}$ | | ⊗ | ⊗ | | | | ⊗ | ⊗ | ⊗ |
| $3^{rd}$ | ⊗ | | | ⊗ | | | ⊗ | ⊗ | ⊗ |
| $4^{th}$ | | ⊗ | | ⊗ | | | ⊗ | ⊗ | ⊗ |
| $5^{th}$ | ⊗ | | ⊗ | | ⊗ | | | ⊗ | ⊗ |
| $6^{th}$ | | ⊗ | ⊗ | | ⊗ | | | ⊗ | ⊗ |
| $7^{th}$ | ⊗ | | | ⊗ | ⊗ | | | ⊗ | ⊗ |
| $8^{th}$ | | ⊗ | | ⊗ | ⊗ | | | ⊗ | ⊗ |
| Reverse 1 | ⊗ | | ⊗ | | | ⊗ | | ⊗ | |
| Reverse 2 | | ⊗ | ⊗ | | | ⊗ | | ⊗ | |

In the second embodiment, as shown in Table 4, 2-OD overdrive gears for three single-stage planetary gear sets and exemplary configurations of gear ratios logic forms for planetary gear sets:

P1(1.2987/1)×P2(0.65789/1)×P3(3.125/1). The values in parentheses are two gearshift ratios of each single-row planetary gear set produced. For this, when (R1/S1)≈3.3478, (R2/S2)≈1.923, and (R3/S3)≈2.125 in the planetary gear sets, the gear ratios layout can be obtained. The distribution of eight forward gears: 4.058_3.125_2.67_2.056_1.298_1_0.854_0.6578. The total gear ratio range (4.058/0.6578)=6.169; In the third embodiment, the highest gear is the constant speed direct gear, and the gear ratios of each planetary gear mechanism is configured as P1(1.56/1)×P2(1.3/1)×P3(3.225/1).

As reference shown in FIG. 1, gears distribution: 6.54_5.03_4.194_3.225_2.028_1.56_1.3_1;

Taken as (out/in) version: 0.1528_0.1987_0.2384_0.31_0.49309_0.641_0.76923_1.

As shown in FIG. 2, in the 0 overdrive gear configuration, the planetary gear set P1 uses two single-row gear sets as subassembly, the first subset planet carrier C1' and the second subgrouping ring gear R1' they are integrally formed in series, with continuing total reduction ratio P1$a$ (1.5)×P1$b$ (1.388)=2.0833; eight gears calculation logic as:

P1(2.083/1)×P2(0.388/1)×P3(4.5454/1);

Gear ratio distribution: 13.152_9.469_6.313_4.545_2.893_2.083_1.388_1; gear ratio range of forward gears is 13.1523.

The compound P1 gear-set characteristic parameters of the 2 subdivided planetary gears can be adjusted, P1$a$ (1.5)×P1$b$ (1.333)=2, and the overall gearshift configuration is P1(2/1)×P2(1.333/1)×P3 (4.1666/1);

gear ratio distribution: 11.111_8.333_5.555_4._166_2.666_2_1.333_1

It should be noted that in the third embodiment, the shift logic sequence of 0 overdrive gear sequence is the same as that in the 1-OD gear logic list, but for second planetary gear train P2, power shifting outputs substantially through direct connection of the arm of the planet carrier C2 to the central main shaft (3). The R2 ring gear bracket is freely mounted and positioned on the central main shaft.

TABLE 5

Three Typical Configurations with Different OD Gears of an Eight-speed Transmission.

| | Type | | | | | |
|---|---|---|---|---|---|---|
| | 0 Overdrive gear With compound PGS1 | | 1 Overdrive gear With compound PGS1 | | 2 Overdrive gear 3 Simple gear sets | |
| Gears | In/out | Ratio Step | In/out | Ratio Step | In/out | Ratio Step |
| 1$^{st}$ | 11.111 | | 5.376 | | 4.11 | |
| 2$^{nd}$ | 8.333 | 1.333 | 4.135 | (1.3) | 3.125 | (1.315) |
| 3$^{rd}$ | 5.555 | 1.5 | 3.2258 | (1.28) | 2.67 | (1.1704) |
| 4$^{th}$ | 4.166 | 1.333 | 2.481 | (1.3) | 2.029 | (1.315) |
| 5$^{th}$ | 2.666 | 1.5625 | 1.666 | (1.48) | 1.315 | (1.542) |
| 6$^{th}$ | 2 | 1.333 | 1.282 | (1.3) | 1 | (1.315) |
| 7$^{th}$ | 1.333 | 1.5 | 1 | (1.28) | 0.854 | (1.1704) |
| 8$^{th}$ | 1 | 1.333 | 0.76923 | (1.3) | 0.6493 | (1.315) |
| R1 | 8.444 | | 3.71 | | 2.928 | |
| R2 | 6.333 | 1.333 | 2.85 | (1.3) | 2.25 | (1.315) |

To sum up, in the eight-speed transmission according to the invention, the planetary gear members in the planetary gear sets P1-P2-P3 are normally independently engaged to transmit torque input/output. The transmission can obtain eight forward torque ratios and two reverse gear ratios through the gang adjustment of clutches CL1-CL5 to transmit the torque from the input shaft to the output shaft via different power train. As shown in Table 5 above, the maximum reduction gear ratio of the first gear can reach 13.1 based on the parameter configuration of the planetary gear sets. In combination with shifting of the clutch, each clutch performs to complete the corresponding displacement to change the engagement path. The load capacity and efficiency is high, the drag friction loss during overall operation is small, and the gear setting is reasonable, thus achieving more prominent economic applicability.

The structure according to the invention can be easily modified into an eight-speed transmission for the pure electric vehicle. After the reverse gear clutch is omitted, only three single-stage planetary gear mechanisms and three shift elements are required. With more gears and simpler shifting, the real-time and comprehensive efficiency of the electric vehicle can be flexibly exerted. Driven by the motor in forward and reverse rotation, three synchronizers shift configuration of engagement sleeve structure being used for the automatic shifting of multi-stage gears, to meet and match requirements for optimal efficiency of the drive motor and the battery pack of the electric vehicle under different operating conditions from low to high speed. The configuration has the characteristics of simple structure, flexible and reliable gear shifting, good operating stability, low power consumption, and high reliability.

Figure 3:
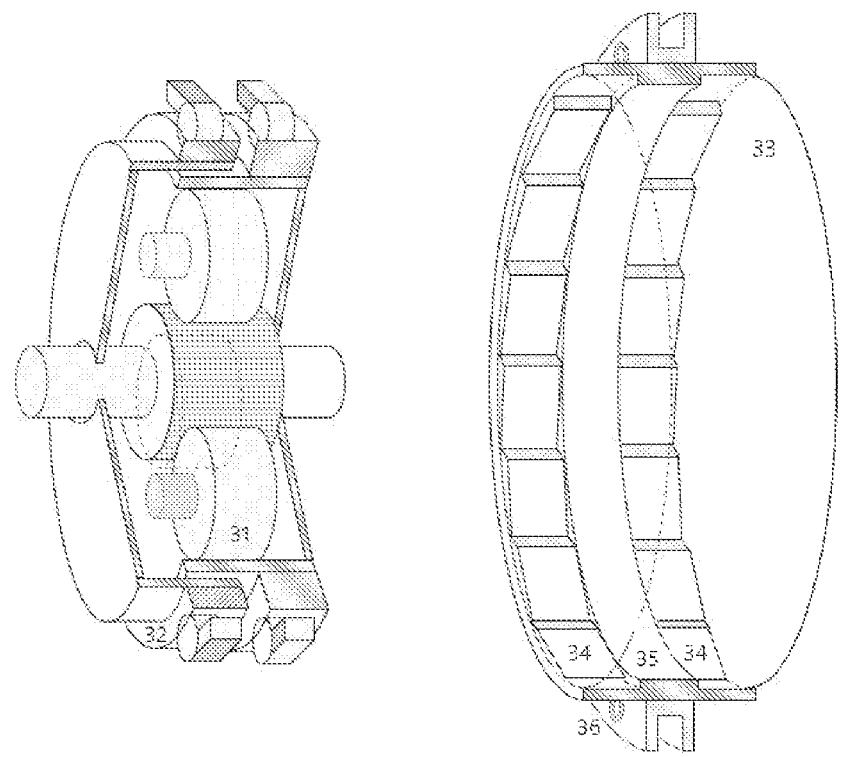
FIG. 3 is a schematic diagram of the relationship between the grooves and the idling distribution on the inner ring surface of the ratchet clutch, and pawl install position on each planetary component collar.

As shown in FIG. 3, the pawl and ratchet mechanism produces specific shifting action due to mutual movement and displacement. A ratchet sliding sleeve (33) is plug-in mounted on collar beams of the cage and can move axially, a smooth inside surface (35) in the middle and ring grooves (34) on both sides are provided on the ratchet sleeve. The grooves can be locked and engaged with the pawl elements on the interior planetary gear set. While no engagement, free idling between the ratchet and pawl is formed on the smooth ring internal surface to disconnect the transmission path with the clutch. The ratchet clutch shift torque transmission by allowing the connection and disconnection of the engagement path between the pawls mounted on different members of the planetary gear train and the grooves distributed on the inner ring surface of the ratchet through translocating.

The ratchet clutch is connected to the longeron of the cage by using the outer collar flange (36) of its sleeve, and the ratchet ring gear is driven by an actuator to move transversely along the longitudinal beams of the cage as a whole to adjust different pawls on two rotating elements of each planetary gear train in retracted idling or released engagement transmission states respectively.

The pawls are mounted on the outer rim surface seats of different rotating members of each planetary gear set and can rotate at an angle under the action of a preloaded spring. Due to the action of spring preload and rotating centrifugal force, the pawls always keep their front tip faces the outer layer and are locked by engaging with the grooves on the inner ring surface of the ratchet, thus transmitting torque as a whole. The number of pawls in each group of shifting paths can be increased accordingly on the planetary gear members, such as 6, 7, and 8. The increase in the number of pawls may realize the advantages of tight locking between the pawl and the outer ratchet, low operating noise, large transmission load, small structural wear, and strong impact resistance.

Figure 4:
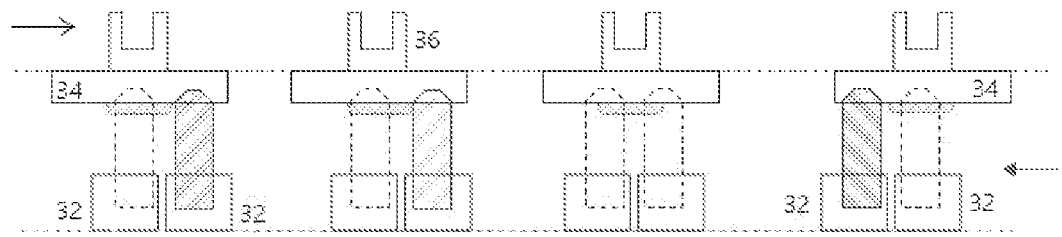
FIG. 4 is a schematic diagram of the shift process between teeth on the inner ring surface of the ratchet and pawls and ratchet coupling engagement.

FIG. 4 is a schematic diagram of the shifting process between two gear ratios of the single-row planetary gear mechanism. A ratchet sleeve clutch 33 is used for the transmission. When the transmission operates for shifting, since the pawl can rotate freely and the front tip is always in elastic contact with the inner ring surface of the ratchet, the degree of freedom of spatial profiling of the clutch is increased. When the contact interface between the inner ring smooth surface 35 or the grooves 34 of the ratchet and the pawls translocating, the pawls in the idling state can be directly translated without resistance and stably into the grooves on the inner ring surface of the ratchet and locked with each other. Moreover, the original engagement gear is automatically discharged. There is no restraint or hysteresis due to runout impact caused by shift engagement, and the adaptability is good and stable. When the clutch is engaged in one gear, it is synchronously disengaged from another gear, so that there is no need to reduce engine power for shifting. In the ratchet and pawl locking engagement clutch transmission, there is practically no friction loss caused by drag resistance in the pawl unlocked idling state as compared with the friction plate clutch, and it has rigid fixed engagement characteristics to realize large load power transmission.

(II) New Sixteen-Speed Transmission Series

The sixteen-speed structure is further expanded and upgraded from eight-speed structure. It has four simple planetary gear trains (P1-P4) and six clutches for transmission. The first to sixth clutches CL1, CL2, CL3, CL4, CL5, and CL6 are arranged in this order along the input and main shaft direction.

The shift clutch according to the invention is compatible with the synchronizer gearshift or dog clutch. Plus pawl and ratchet coupling as a full line combination in the frame in operation. The clutches CL1 and CL2 on the first roller cage selectively move to adjust the mutual engagement of different end faces of individual rotating element between the planetary gear sets P1 and P2 to complete four-gear shifting sequences. The gear shifting of P3 is then adjusted by the clutch CL3 to form eight gear ratios and output them through the second cage. Further, via CL4 cooperates with CL5, to modulate the planetary gear mechanism P4 for another extra 2 gear ratio, then sum up total sixteen-speed transmission series. By clutch CL6 derives the gear ratios through the third cage to output shaft. As a result, the rotation of the respective internal elements of planetary gear sets P1-P4 and the different transmission paths realize sixteen forward gears and four to five reverse gears, with simple and reliable shift adjustment.

TABLE 6

| | Input | Output | Stationary | Calculation | Gear Ratio | Ring-to-Sun ratio |
|---|---|---|---|---|---|---|
| P1 | Ring (R) | Planet Carrier | Sun | (1 + S1/R1) | | |
| P2 | Planet Carrier | Ring (R) | Sun | 1/(1 + S2/R2) | | |
| P3 | Sun | Planet Carrier | Ring | 1 + (R3/S3) | 2.5 | 1.5 |
| P4 | Sun | Planet Carrier | Ring | 1 + (R4/S4) | 5 | 4 |
| | | Ring | Planet Carrier | −(R4/S4) | 4 | |

Table 6 shows the basic configuration and parameters of the sixteen forward gear planetary gear set. The characteristic parameters of P3 and P4 have fixed values in the whole structural sequence. The ring gear R3 of P3 is fixed on the backside of the fixing bracket of S2. The planet carrier C4 and the ring gear R4 of gear set P4 can be locked respectively to generate forward and reverse output or being idle simultaneously. The specific planetary gear mechanism characteristic parameters (ring-to-sun ratios) of P1-P2 may be adjusted to obtain the gear ratios of gearshift with different distribution characteristics and the complete series of gear ratios.

In the fourth embodiment, four simple planetary gear mechanisms and six clutch transmissions form a sixteen-speed (2-0D) transmission series.

Figure 5:
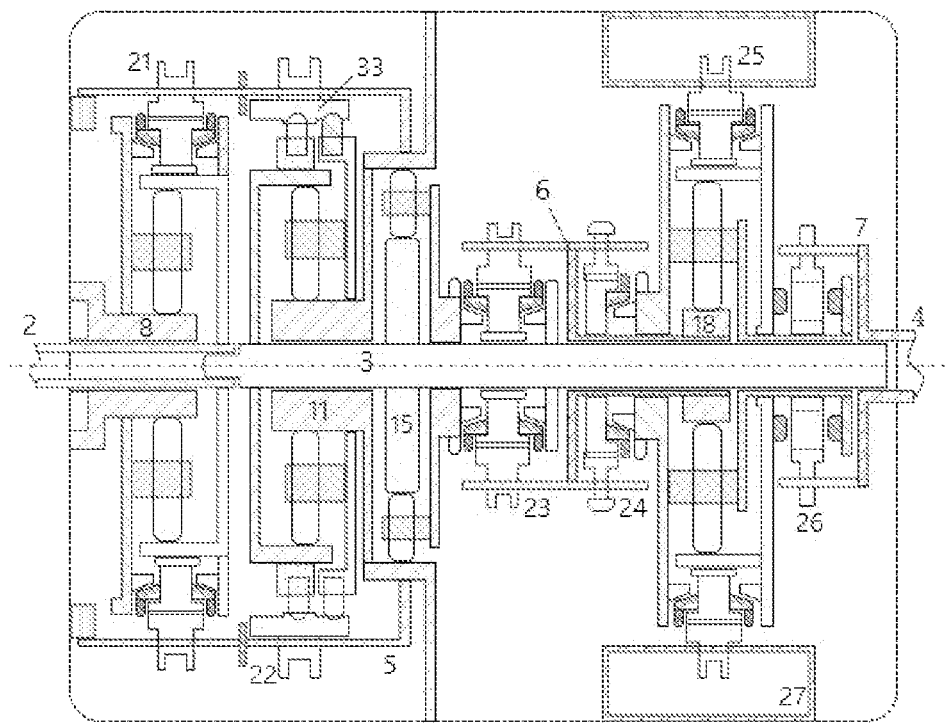
FIG. 5 is a structural diagram of a sixteen forward gears transmission (four single-stage planetary sets) according to the fourth and fifth embodiment.

As shown in FIG. 5, the gear ratio configurations of the planetary gear sets in the sixteen forward gear 2-OD high gear sequence: P1 is R1 source power input, and C1 is speed-down output or R1 input and R1 direct output; P2 is C2 input, and R2 is speed-up output or R2 input and direct constant speed output; P3 is S3 input, and from C3 is speed-down output, or idling and instead of direct 1:1 model that equal with bypass of P2-R2 output via the main shaft; P4 is always S4 input, and C4 is speed-down output or R4 reverse output reverse gear; or P4 overall constant speed 1:1 output.

TABLE 7

Logic Diagram of Gear Engagement for Sixteen Forward Gear (2-OD) Ratio Series.

| | | | | | Engage | | | P4_CL5 | | |
|---|---|---|---|---|---|---|---|---|---|---|
| | P1_CL1 | | P2_CL2 | P3_CL3 | CL4 | C4 | R4 | | P4_CL6 | |
| Gears | C1 | R1 | R2 | C2 | C3 | R2 | C4-S4 | (Lock) | (Lock) | R4 | C4 |
| 1st | ⊗ | | ⊗ | | ⊗ | | | | ⊗ | | ⊗ |
| 2nd | | ⊗ | ⊗ | | ⊗ | | | | ⊗ | | ⊗ |
| 3rd | ⊗ | | | ⊗ | ⊗ | | | | ⊗ | | ⊗ |
| 4th | | ⊗ | | ⊗ | ⊗ | | | | ⊗ | | ⊗ |
| 5th | ⊗ | | ⊗ | | | ⊗ | | | ⊗ | | ⊗ |
| 6th | | ⊗ | ⊗ | | | ⊗ | | | ⊗ | | ⊗ |
| 7th | ⊗ | | | ⊗ | | ⊗ | | | ⊗ | | ⊗ |
| 8th | | ⊗ | | ⊗ | | ⊗ | | | ⊗ | | ⊗ |
| 9th | ⊗ | | ⊗ | | ⊗ | | ⊗ | | | | ⊗ |
| 10th | | ⊗ | ⊗ | | ⊗ | | ⊗ | | | | ⊗ |
| 11th | ⊗ | | | ⊗ | ⊗ | | ⊗ | | | | ⊗ |
| 12th | | ⊗ | | ⊗ | ⊗ | | ⊗ | | | | ⊗ |
| 13th | ⊗ | | ⊗ | | | ⊗ | ⊗ | | | | ⊗ |
| 14th | | ⊗ | ⊗ | | | ⊗ | ⊗ | | | | ⊗ |
| 15th | ⊗ | | | ⊗ | | ⊗ | ⊗ | | | | ⊗ |
| 16th | | ⊗ | | ⊗ | | ⊗ | ⊗ | | | | ⊗ |
| Reverse 1 | ⊗ | | ⊗ | | | | ⊗ | | | ⊗ | |
| Reverse 2 | | ⊗ | ⊗ | | | | ⊗ | | | ⊗ | |
| Reverse 3 | ⊗ | | | ⊗ | | | ⊗ | | | ⊗ | |
| Reverse 4 | | ⊗ | | ⊗ | | | ⊗ | | | ⊗ | |

Logic formula of gear ratios for planetary gear sets: P1(1.25/1)×P2(0.666/1)×P3(2.5/1)×P4(5/1).

By adjusting ring-to-sun ratios of planetary gear mechanisms P1-P2. When (R1/S1)=4 and (R2/S2)=2, the distribution of sixteen forward gears:

15.625_12.5_10.416_8.333_6.25_5_4._166_3.333_3._125_2.5_2.083_1.666_1.25_1-0._833_0._666

With reference to the (out/in) gear ratio form, the above arrangement of gear ratios is based on P1(1/0.8)×P2(1/1.5)×P3(1/0.4)×P4(1/0.2).

Gears layout:
0.064_0.08_0.096_0.12_0.16_0.2_0.24_0.3_0.32_0.4_0.48_0.6_0.8_1_1.2_1.5.

The (input/output) characteristic parameters of the planetary gear sets P1 and P2 can be adjusted separately as formula: P1(1.282/1)×P2(0.666/1)×P3(2.5/1)×P4 (5/1), gears layout:

17.8_13.888_11.876_9.259_6.41_5_4.2735_3.56_3.333_2.777_2.374_1.851_1.28_1-0.854_0.666

As shown in FIG. 5, four single-stage planetary gear mechanisms P1, P2, P3 and P4 as well as six shift clutches CL1, CL2, CL3, CL4, CL5 and CL6 are provided in line. Four connecting members are the first, second and third cages and the central main shaft respectively. This transmission mode forms a clear power flow path that transfers the input torque at the front end of the transmission to the internal elements in parallel distribution, so that the load can be evenly distributed to the planetary gear mechanisms and engagement members, to effectively improve torque transmission efficiency and durability under output conditions. It meets the synchronous shifting action during upshift and downshift, with simple and fast gear shifting, small momentum, and good stability.

In the fifth embodiment, for the shift path/logic of the sixteen forward gear 1-OD gear sequence, four single-stage planetary gear trains are arranged axially in sequence. When the ring-to-sun ratios of P1-P2 are calculated as 2 and 4, the kinematic equation P1(1.5/1)×P2(0.8/1)×P3(2.5/1)×P4(5/1), Gear ratios layout:
18.75_16_12.5_10_7.56_5_4_3.75_3_2.5_2_1.5_1.2_1_0.8

TABLE 8

Sequential Logic Diagram of Shift Control Keys for Sixteen Gear (1-OD) Ratio Series.

| Gears | CL1 | CL2 | CL3 | CL4 | C4 | R4 | CL5 | | R4 | CL6 |
|---|---|---|---|---|---|---|---|---|---|---|
| | C1 | R1 | R2 | C2 | C3 | R2 | C4-S4 | (Lock) | (Lock) | R4 | C4 |
| $1^{st}$ | ⊗ | | ⊗ | ⊗ | | | | | | ⊗ | ⊗ |
| $2^{nd}$ | ⊗ | | | ⊗ | ⊗ | | | | | ⊗ | ⊗ |
| $3^{rd}$ | | ⊗ | ⊗ | ⊗ | | | | | | ⊗ | ⊗ |
| $4^{th}$ | | ⊗ | | ⊗ | ⊗ | | | | | ⊗ | ⊗ |
| $5^{th}$ | ⊗ | | ⊗ | | ⊗ | | | | | ⊗ | ⊗ |
| $6^{th}$ | ⊗ | | | ⊗ | ⊗ | | | | | ⊗ | ⊗ |
| $7^{th}$ | | ⊗ | ⊗ | | ⊗ | | | | | ⊗ | ⊗ |
| $8^{th}$ | | ⊗ | | ⊗ | ⊗ | | | | | ⊗ | ⊗ |
| $9^{th}$ | ⊗ | | ⊗ | ⊗ | | ⊗ | | | | | ⊗ |
| $10^{th}$ | ⊗ | | | ⊗ | ⊗ | ⊗ | | | | | ⊗ |
| $11^{th}$ | | ⊗ | ⊗ | ⊗ | | ⊗ | | | | | ⊗ |
| $12^{th}$ | | ⊗ | | ⊗ | ⊗ | ⊗ | | | | | ⊗ |
| $13^{th}$ | ⊗ | | ⊗ | | ⊗ | ⊗ | | | | | ⊗ |
| $14^{th}$ | ⊗ | | | ⊗ | ⊗ | ⊗ | | | | | ⊗ |
| $15^{th}$ | | ⊗ | ⊗ | | ⊗ | ⊗ | | | | | ⊗ |
| $16^{th}$ | | ⊗ | | ⊗ | ⊗ | ⊗ | | | | | ⊗ |
| Reverse 1 | ⊗ | ⊗ | | ⊗ | | | ⊗ | | | | ⊗ |
| Reverse 2 | ⊗ | | ⊗ | ⊗ | | | ⊗ | | | | ⊗ |
| Reverse 3 | | ⊗ | ⊗ | ⊗ | | | ⊗ | | | | ⊗ |
| Reverse 4 | ⊗ | | ⊗ | ⊗ | | | ⊗ | | | | ⊗ |

Gears layout: 20.833_16.66_12.5_10_8.33_6.66_5_4.166_4_3.333_2.5_2_1.666_1.333_1_0.8

Layout (out/in): 0.048_0.06_0.08_0.1_0.12_0.15_0.2_0.24_0.25_0.3_0.4_0.5_0.6_0.75_1_1.25

In the $6^{th}$ embodiment, a 3-OD high gear sequence configuration is provided, where the input shaft is directly connected to the first planet carrier. The first planetary gear set P1 can increase the speed of the input shaft by using the ring gear R1 and transmit the increased speed to the planetary gear set P2 via the first cage (I), or the planet carrier C1 directly conducts the input speed. With three overdrive gears, the sixteen-speed transmission can achieve a gear ratio span of 23.4375, which ensures uniform optimization of step ratios among gearshift while efficiently performing multi-gear synchro synergism, thus improving drivability, such as acceleration performance before and after shifting according to engine speed stability. Moreover, the transmission maintains the high load characteristics of low gear and large reduction gear ratio, thus maximizing the engine driving efficiency

TABLE 9

Example of 3-OD Gear Sequence Configuration: P1 (0.8/1) × P2 (0.666/1) × P3 (2.5/1) × P4 (5/1).

| $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ | $13^{th}$ | $14^{th}$ | $15^{th}$ | $16^{th}$ |
|---|---|---|---|---|---|---|---|---|---|---|---|---|---|---|---|
| 12.5 | 10 | 8.333 | 6.666 | 5 | 4 | 3.333 | 2.666 | 2.5 | 2 | 1.666 | 1.333 | 1 | 0.8 | 0.666 | 0.533 |
| 0.08 | 0.1 | 0.12 | 0.15 | 0.2 | 0.25 | 0.3 | 0.375 | 0.4 | 0.5 | 0.6 | 0.75 | 1 | 1.25 | 1.5 | 1.875 |

Figure 6:
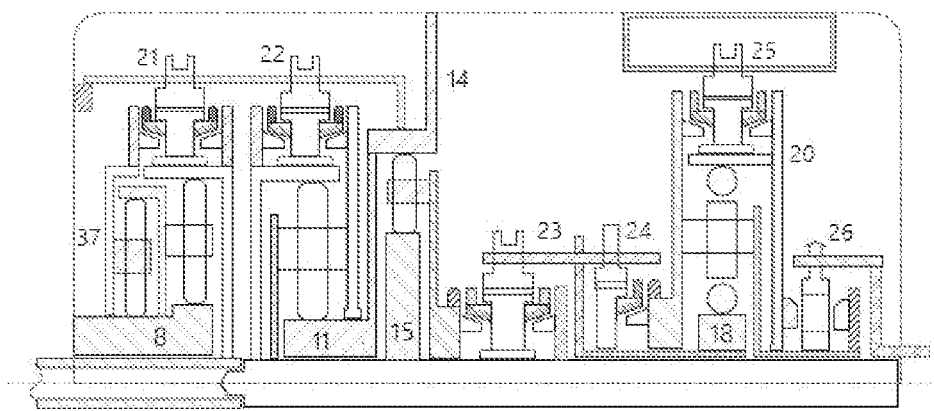
FIG. 6 is a structural diagram of the sixteen-speed transmission which has two sub gear-sets jointly cascade amplification gear ratio in the compound P1 planetary gear train according to the invention.

FIG. 6 shows a schematic structure of the first planetary gear train of the transmission with two sub member planetary gear sets of simply cascade connecting in series to obtain one large reduction ratio. Two sub gear sets have same dynamic frame. The lower part of the symmetrical rotation center is omitted from the figure. The clutches CL3 and CL4 share the second cage (II) of load-supporting. Because CL6 has few shift frequency and lower engagement speed when forward and reverse gear exchanged, the dog type synchronization can also keep shift accuracy and stability, the clutch action being ensured.

If the first planetary gear set P1 is a compound speed reduction structure with two sub planetary gears in series, P1$a$ (1.333)×P1$b$ (1.25)=1.6666, and the sixteen-speed transmission of 1-OD gear ratio kinematic sequence is calculated as follows: P1 (1.666/1)×P2(0.8/1)×P3(2.5/1)×P4 (5/1), The second row in the table lists the (output/input) ratios reference, and the calculation logic formula is P1(1/1.25)× P2(1/1.5)×P3(0/0.4)×P4(1/0.2).

In the $7^{th}$ embodiment, the optimal 0-OD (the top gear is the direct gear) for heavy-duty low gears applications configuration can obtain for sixteen-speed. When P1(1.5/1)×P2 (1.25/1)×P3(2.5/1)×P4(5/1) is configured and the ring-to-sun ratios of P1-P2 are calculated as 2 and 4, gear ratios as follow:
23.4375_18.75_15.625_12.5_9.375_7.5_6.25_5_4.6875_3.75_3.125_2.5_1.875_1.5_1.25_1

The transmission here is generally applicable to various heavy-duty machines power trains. It can be used to perform operations in industrial fields such as mining, construction, agriculture, and transportation. For example, it is especially suitable for construction machinery, tractors, wheel loaders, excavators, trucks, and material handlers. It can be used to achieve a variety of complex powertrain tasks.

With reference to FIG. 6, in the 0 overdrive gear configuration, the planetary gear set P1 uses two sub single-row planetary gear mechanisms, and the first sub planet carrier and the second sub ring gear are integrally forged in series, with a total reduction ratio P1$a$(1.333)×P1$b$(1.25)=1.666, for example, gears kinematic equation built as P1 (1.666/1)×P2(1.25/1)×P3(2.5/1)×P4(5/1), where the ring-to-sun ratio of P2 is still 4, and P2 power shifting output achieved by directly connecting the rotating arm of the planet carrier C2 to the central main shaft (3). The R2 ring gear bracket is freely mounted and positioned on the central main shaft. Thus more robust and uniform lower gear ratios can be derived.

TABLE 10

0-OD Gear sequence: The values in the second row are reference of the (out/input) manner.

| $1^{st}$ | $2^{nd}$ | $3^{rd}$ | $4^{th}$ | $5^{th}$ | $6^{th}$ | $7^{th}$ | $8^{th}$ | $9^{th}$ | $10^{th}$ | $11^{th}$ | $12^{th}$ | $13^{th}$ | $14^{th}$ | $15^{th}$ | $16^{th}$ |
|---|---|---|---|---|---|---|---|---|---|---|---|---|---|---|---|
| 26.04 | 20.38 | 15.625 | 12.5 | 10.416 | 8.33 | 6.25 | 5.2 | 5 | 4.16 | 3.125 | 2.5 | 2.083 | 1.66 | 1.25 | 1 |
| 0.038 | 0.048 | 0.064 | 0.08 | 0.096 | 0.12 | 0.16 | 0.192 | 0.2 | 0.24 | 0.32 | 0.4 | 0.48 | 0.6 | 0.8 | 1 |

In this sequence, the 8th and 9th gears can combine into one gear, that is, the full range of gear ratios is of a 15 forward gear compact mode. The capability of low gears and large gear ratios is conducive to the flexible determination of differential, main reduction ratio of the drive axle main reducer of the power train for heavy-duty wheeled vehicles, which fully improves the power performance of various types of vehicles. For off-road vehicles, engineering vehicles and trailers, the normal additional system reduction transmission components (e.g., 2 speeds rear axle/differential) need to be provided to generate additional tractive effort, which corresponding provides the possibility of streamlining the powertrain and realizes realistic cost savings by this option.

In this way, in the sixteen forward gear transmission, the clutches CL1 and CL2 are reciprocated on the first cage (I), so that the different rotating members of the interior planetary gear sets P1-P2 of the first cage may be selectively adjusted to generate different input/output ratios initially. Further, with CL3-CL4-CL5 in conjunction and CL6 in the end, the torque from the input shaft to the output shaft getting variable speeds through different engagement with the clutch dispatch, relying on the power on-off adjustment generated by the morphological switch of the corresponding planetary gear elements, so that as a gang connected unit to jointly transmit power/torque, or disengaged as a freewheel are easily achieved one by one.

Table 11 shows the 0-OD, 1-OD, 2-OD and 3-OD overdrive configuration transmission series formed by the internal variable structures of four simple planetary gear sets with different characteristic parameters (ring-to-sun ratios). The first planetary gear set P1 may reduce (or increase) the speed of the input shaft and transmit the reduced (or increased) speed to the second planetary gear set P2 via the first cage (I) or transmit the input speed at constant speed. The second planetary gear set P2 selectively receives the upshift or downshift speed from the first planetary gear set P1 or the constant speed from the input shaft, and subsequently outputs them through the central main shaft via the ring gear R2 (or the planet carrier C2) to the third and fourth planetary gear sets P3-P4 at a variable or constant speed by the second cage (II), to establish and obtain more suitable gear ratios and ratio progressions, which diversifies the gear ratio sequence of the transmission, thus meeting various vehicle driving needs.

To sum up, four planetary gear trains operating independently include the planetary gear units P1, P2, P3 and P4 arranged sequentially in the direction from the input shaft to the output shaft. Based on the characteristic parameters (ring-to-sun ratios) of planetary gears, the gear ratios of each gear and the ratio step between gears is in a uniform range. The transmission efficiency is high, and the double-pointed clutches control is simple and fast. The drives of the clutches are adjusted by the hydraulic assembly, SVA electric assembly, or pneumatic actuator through reciprocating driving accordingly.

The torque transmission mechanism is a synchronizer, or ratchet and pawl coupling clutch, with an optional dog clutch. The transmission has a wide range of gear ratios, a high degree of freedom and flexibility in setting the gear train, and a more uniform upshift/downshift amplitude.

TABLE 11

| | Type | | | | | | | |
|---|---|---|---|---|---|---|---|---|
| | 0 Overdrive gear | | 1 Overdrive gear | | 2 Overdrive gear | | 3 Overdrive gear | |
| Gear | Ratio | Step | Ratio | Step | Ratio | Step | Ratio | Step |
| $1^{st}$ | 23.4375 | | 18.75 | | 15.625 | | 12.5 | |
| $2^{nd}$ | 18.75 | (1.25) | 16.666 | (1.25) | 12.5 | (1.25) | 10 | (1.25) |
| $3^{rd}$ | 15.625 | (1.2) | 12.5 | (1.333) | 10.416 | (1.2) | 8.333 | (1.2) |
| $4^{th}$ | 12.5 | (1.25) | 10 | (1.25) | 8.333 | (1.25) | 6.666 | (1.25) |
| $5^{th}$ | 9.375 | (1.333) | 8.333 | (1.2) | 6.25 | (1.333) | 5 | (1.333) |
| $6^{th}$ | 7.5 | (1.25) | 6.666 | (1.25) | 5 | (1.25) | 4 | (1.25) |
| $7^{th}$ | 6.25 | (1.2) | 5 | (1.333) | 4.166 | (1.2) | 3.333 | (1.2) |
| $8^{th}$ | 5 | (1.25) | 4.1666 | (1.2) | 3.333 | (1.25) | 2.666 | (1.25) |
| $9^{th}$ | 4.6875 | (1.0665) | 4 | (1.0416) | 3.125 | (1.066) | 2.5 | (1.066) |
| $10^{th}$ | 3.75 | (1.25) | 3.333 | (1.2) | 2.5 | (1.25) | 2 | (1.25) |
| $11^{th}$ | 3.125 | (1.2) | 2.5 | (1.333) | 2.083 | (1.2) | 1.666 | (1.2) |
| $12^{th}$ | 2.5 | (1.25) | 2 | (1.25) | 1.666 | (1.25) | 1.333 | (1.25) |
| $13^{th}$ | 1.875 | (1.333) | 1.5 | (1.2) | 1.25 | (1.333) | 1 | (1.333) |
| $14^{th}$ | 1.5 | (1.2) | 1.2 | (1.25) | 1 | (1.25) | 0.8 | (1.25) |
| $15^{th}$ | 1.25 | (1.2) | 1 | (1.333) | 0.833 | (1.2) | 0.666 | (1.2) |
| $16^{th}$ | 1 | 1.25 | 0.8 | (1.25) | 0.666 | (1.25) | 0.5333 | (1.25) |

Multi-gear interval overpass operations can be preferred according to real-time jump operating conditions. The transmission mechanism is capable of achieving both heavy-duty performance with low gear ratios and reduced fuel consumption of high-speed driving with high gear ratios. It contributes to the reduction of the size, weight and manufacturing cost of the automatic transmission and has excellent overall performance.

As described above, compared with the existing gearshift products, according to the invention, the first, second, and third (fourth) simple planetary gear sets are configured and independently cascade connected in series to form an integrated planetary gear transmission system. In different single-stage planetary gear trains, clutch is selectively engaged and locked with different components members, so that the input/output transmission is carried out by different rotating members in different planetary gear sets, thus changing the final output gear ratio of the power flow to form different gears distribution.

The transmission assembly structure according to this embodiment is novel in design. The internal gear ratios of gang connected single-stage planetary gear mechanisms are changed through synchronizer and the ratchet/pawl coupling clutch to integrate and combine different gear ratios to complete output. It is different structural design from the conventional automatic transmission in terms of power transmission path and framework. The transmission assembly is characterized by smaller size, compact structure, simple operating principle, high efficiency, and good operating reliability and durability.

The embodiments above are only the preferred embodiments of the invention. The associated operation of gear sets and the calculation of gear ratios will be readily understood by those skilled in the art. The invention can be modified and varied in various ways. Any modifications, equivalent replacements and improvements made within the invention or the design spirit and principle of the invention are intended to be covered by the protection scope of the invention.

The invention claimed is:

1. An sixteen forward gear planetary gear mechanism automatic transmission series, wherein it comprises; sixteen forward speeds and four reverse speeds realized by combining four simple planetary gear sets with six torque engagement elements, a first planetary gear set P1, a second planetary gear set P2, a third planetary gear set P3, and a fourth planetary gear set P4 are all single pinion type planetary gears and have first to fourth sun gears S1-S4, first to fourth planet carriers C1-C4, and first to fourth ring gears R1-R4 respectively; the four planetary gear sets are sequentially arranged in the axial direction, wherein the first planetary gear set P1 and the second planetary gear set P2 both have a fixed mode of the first sun gear S1 and the second sun gear S2, the sun gear S1 is fixedly mounted on a front end cover of a case body, and the sun gear S2 is separately fixed on a positioning bracket of the inner housing of the transmission body; the third ring gear R3 of the third planetary gear set P3 is fixedly mounted on the other side of the positioning bracket of the second sun gear S2; the fourth planet carrier C4 and the fourth ring gear R4 of the fourth planetary gear set P4 may be selectively fixedly locked respectively or simultaneously idled, reverse gears are directly obtained by adjusting the internal variable relationship of the single-row planetary gear assembly, and on the premise that the fourth sun gear S4 is input, either the fourth planet carrier C4 or the fourth ring gear R4 can be separately locked by a bidirectional double clutch to undertake output functions of forward gears or reverse gears; in the forward gear state, the fourth ring gear R4 is always kept in a locked and fixed state, while a first clutch CL1, a second clutch CL2, a third clutch CL3, a fourth clutch CL4, a fifth CL5, and a sixth clutch CL6 are sequentially arranged in an input shaft direction.

2. The sixteen forward gear planetary gear mechanism automatic transmission series according to claim 1, wherein the first planetary gear set P1 and the second planetary gear set P2 share a first cage for shifting and transmission, and the first sun gear S1 and the second sun gear S2 are always operated as fixed members; the first clutch CL1 is arranged and sleeved on a longitudinal beam of the first cage on a periphery of the first planetary gear set P1; the second clutch CL2 is arranged and sleeved on the longitudinal beam of the first cage on an outer layer of the second planetary gear set P2; Each coaxially arranged single-stage planetary gear train independently generate an (in/out) gear ratio; moreover, a power input end of the planetary gear train may also be directly used as an output end to transmit torque at a constant speed of 1:1, so that each simple planetary gear mechanism has two fixed-value shifting output degrees of freedom; three to four simple planetary gear sets are sequentially arranged in the axial direction, with different characteristic parameter values (ring-to-sun ratios), and are selectively engaged and adapted with the clutches, thus generating sixteen gear ratio series with overall uniform distribution.

3. The sixteen forward gear planetary gear mechanism automatic transmission series according to claim 1, wherein a first connecting member, is a first cage (I), is configured as a driver for variable-speed synchro drive between the first planetary gear set P1 output and the second planetary gear set P2 input; a second connecting member, is a central main shaft, is configured for conducting variable-speed and torque between the second planetary gear set P2 and the third planetary gear set P3; a third connecting member, is a second cage (II), is configured for variable-speed synchro drive between the second planetary gear set P2 output through a main shaft to the third planetary gear set P3 output, and next to the fourth planetary gear set P4 input; a fourth connecting member, is a third cage (III), is configured for conducting variable-speed and torque between the fourth planetary gear set P4 and an output shaft.

4. The sixteen forward gear planetary gear mechanism automatic transmission series according to claim 1, a torque transmission mechanism is at least one of a synchronizer clutch, a dog clutch and ratchet and pawl coupling element clutch, a ratchet ring gear sleeve is a shift driving unit; the first clutch CL1 is configured to output different torques of the first planet carrier C1 and the first ring gear R1 of the first planetary gear set P1 to a first cage (I) by selectively connecting outer peripheral teeth of their respective members; the second clutch CL2 is configured to input different torques, transmitted by the first planetary gear set P1 via the first cage by selectively connecting outer peripheries of respective members of the second ring gear R2 and the second planet carrier C2 of the second planetary gear set P2; the third clutch CL3 is configured to selectively engage and transmit-receive via a second cage (II) for a fixed reduced speed output of the third planetary gear set P3-C3 or the variable-speed transmitted from the second ring gear R2 of the second planetary gear set P2 via a central main shaft; the fourth clutch CL4 is configured to lock in the fourth sun gear S4 to the fourth planet carrier C4 when the planetary gear set P4 is idling and have no fixed output, so that the fourth planetary gear set P4 rotates at a constant speed of 1:1; the fifth clutch CL5 is configured to selectively lock up and fix the fourth planet carrier C4 or the fourth ring gear R4 of the fourth planetary gear set P4, so that the fourth planetary gear set P4 has a clear internal variation operating mode, or the fourth planet carrier C4 and the fourth ring gear R4 are not fixed and cause idling together, the sixth clutch CL6 is configured to finally transmit different torques of the fourth planetary gear set P4 to the output shaft of the transmission via a third cage (III) by selectively connecting the output ends of the ring gear R4 and the carrier C4 of the fourth planetary gear set P4 through an engagement sleeve.

5. The sixteen forward gear planetary gear mechanism automatic transmission series according to claim 4, the synchronizer clutch can use double cone and triple cone type in order to facilitate the connectivity of the connection-oriented make-break operation; each planetary component of the gear set, has a synchronizing cone fixed on its sidewall as a collar rim drive, these collar cone cups and the baulk ring from the synchronizing clutch, as synchromesh counterparts to match, with smooth butt and collar joint getting low energy cost and high load capacity.

6. The sixteen forward gear planetary gear mechanism automatic transmission series according to claim 4, wherein in the ratchet and pawl clutch member transmission pair, the ratchet ring gear itself is a clutch; for a ratchet and pawl coupling, relative to the pawl elements and a smooth hollow sleeve wall surface without engagement are provided on the inner ring surface of the ratchet part; the grooves of the ratchet locking part and the smooth hollow sleeve part have different geometries and are equally spaced on the inner ring surface of the ratchet ring; through the parallel sliding of the ratchet on the cage, the engagement transmission path between the pawls mounted on different rotating members of the planetary gear, and the grooves on the inner ring surface of the ratchet ring gear are allowed to be connected and disconnected, thus generating new torque shifting, in the ratchet and pawl transmission pair, one is active input and the other is driven output, so as to transmit power and torque in turn; the automatic transmission uses a ratchet ring gear type clutch, so that the clutch may be disengaged from another gear when the clutch is engaged in one gear during gear shifting, and there is no power interruption during synchronous gear shifting and there is no need to reduce engine power during gear shifting.

7. The sixteen forward gear planetary gear mechanism automatic transmission series according to claim 1, wherein drives of the clutches are adjusted by at least one of a hydraulic assembly, SVA electric assembly, and pneumatic actuator through reciprocating driving accordingly.

* * * * *